INVENTORS
JOHN E. LEONARD
BY HIDEO WATANABE

ATTORNEY

United States Patent Office 3,278,408
Patented Oct. 11, 1966

3,278,408
ELECTROCHEMICAL CELL
John E. Leonard and Hideo Watanabe, Fullerton, Calif., assignors to Beckman Instruments, Inc., a corporation of California
Filed Dec. 19, 1962, Ser. No. 245,869
7 Claims. (Cl. 204—195)

This application is a continuation-in-part of our copending application Serial No. 158,967, entitled Electro-chemical Cell, filed December 13, 1961, assigned to the same assignee as the present application, now abandoned.

This invention relates generally to electrochemical cells for measuring a constituent in a fluid sample and, more particularly, to an improvement in those classes of cells generally referred to as polarographic cells.

Electro-chemical cells of the type to which this invention pertains generally comprise a pair of electrodes joined by an electrolyte and separated from the sample media to be analyzed by means of a membrane that is permeable to a constituent in the sample, but is non-permeable to the electrolyte. Such a cell is described in United States Patent No. 2,913,386. Generally cells of this type are referred to as polarographic cells. In these cells, a suitable voltage difference is impressed between the pair of electrodes, and, in the absence of the constituent in the sample that is to be analyzed, the electrode system becomes polarized so that the current which normally flows through the electrolyte is reduced, to nearly zero, after a short time. In the presence of the constituent in the sample that is to be analyzed, the electrode system becomes depolarized and current flows again. The magnitude of the current in these devices is a function of the rate or speed with which the constituent to be analyzed can pass through the membrane and of the diffusion process that takes place in the immediate vicinity of the system, particularly the membrane. As the constituent to be analyzed has to pass through the membrane and diffuse through electrolyte disposed between the membrane and an electrode, the spacial relationship between the membrane that is permeable to the constituent and the electrode is extremely important. It has been found that some membranes such as polytetrafluoroalkane (e.g., "Teflon"), and to a lesser degree such materials as polyethylene and polypropylene, are quite suitable for these cells. Polytetrafluoroalkane, especially, allows relatively rapid passage of some constituents that are analyzed, the most important of which is oxygen.

Though the cells of the above-mentioned type have given accurate performance for many practical situations, it has been found that occasionally a shift in calibration of the reading of the cells has appeared. After careful analysis it has been determined that this shift is due to changes in the spacial relationship between the "Teflon" or polyethylene membrane and the electrode surface against which it is placed. Attempt has been made to overcome such shortcomings in behavior by tightly squeezing the membrane toward the electrode surface. However, two types of difficulties have been encountered when this has been done. In the first place, it is possible that by tightly squeezing a "Teflon" membrane against an electrode surface, the electrolyte film that is disposed between the membrane and the electrode becomes completely squeezed out which, of course, makes the electrode inoperable. Secondly, it has been observed that when a membrane of the type described is placed under high tension, a considerable amount of cold flow takes places which changes, after a few days, the tension that was originally applied. Thus, the response of these electrodes does not remain completely constant due to changes in the spacial relationship between the electrode and the membrane.

An additional factor which may cause a change in the spacial relationship between the membrane and an electrode is the temperature to which the electrode assembly is subjected. If the temperature of the electrode system decreases after the time of assembly of the electrode, it is possible that the "Teflon" or polyethylene membrane may become more tightly stretched over the electrode and thus squeeze out the electrolyte between the membrane and the electrode. Additionally, if the temperature increases after the time of assembly, the membrane may expand and separate somewhat from the electrode over which it was originally stretched. This results in an additional amount of electrolyte flowing between the membrane and the electrode due to the greater spacial relationship between the electrode and membrane, thus causing shifts in calibration of the reading of the electrodes.

It is therefore the principal object of the present invention to overcome these above-mentioned difficulties by providing a stable cell for polarographic analysis which is substantially free from shifts in calibration of the reading of the cell.

It is an additional object of the present invention to provide an electro-chemical cell for polarographic analysis of a constituent having novel means for defining the spacial relationship between a membrane and an electrode.

A further object of the present invention is to provide an electro-chemical cell for polarographic analysis in which the spacial relationship between the membrane and electrode is maintained substantially constant by providing a second membrane to hold the first membrane in fixed spacial relationship with respect to the electrode, with said second membrane constituting the sole means for holding the first membrane in such position.

According to a particular aspect, the present invention comprises a cell for polarographic analysis of a constituent in a sample and includes a base structure with a pair of spaced electrodes disposed thereon. A first free-floating membrane that is permeable to the constituent is located in close proximity to one of the electrodes. An electrolyte is disposed in the base structure for joining the two electrodes, part of the electrolyte being in the form of a film disposed between said first membrane and its associated electrode. A second membrane that is relatively more permeable for the constituent than the first membrane, and which also has the characteristic of being elastomeric, overlies the first membrane. The elastomeric membrane is held under tension on the base structure to retain the first membrane in a fixed spacial relationship with respect to the first electrode, such tension being sufficient to cause the elastomeric membrane to remain under tension in spite of any temperature variations normally encountered. Hence, there will be provided a means for constantly forcing the first membrane toward the electrode so that the first membrane will not become separated from the electrode and, therefore, the spacial relationship of the first membrane and electrode is maintained essentially constant. Also, since the first membrane is free-floating, the second membrane comprises the sole means for holding the first membrane against the electrode. Hence, the free-floating membrane will not be subjected to the cold flow that normally takes place after a few days when a "Teflon" or polyethylene membrane is subjected to tension.

Other objects, aspects and advantages will become apparent from the following description taken in connection with the accompanying drawing wherein.

Figure 1:
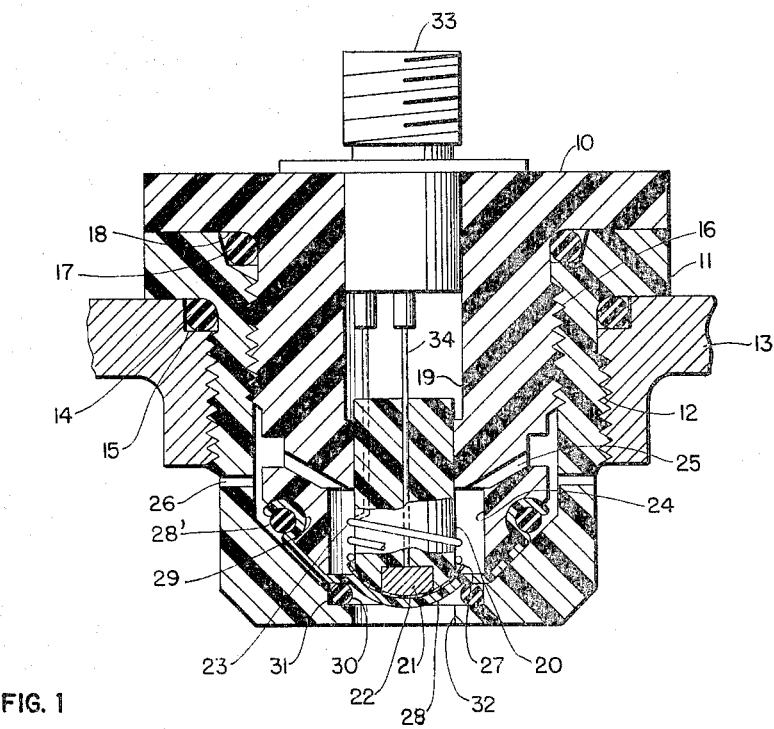
FIG. 1 is a sectional view of the preferred form of the invention.
Figure 2:
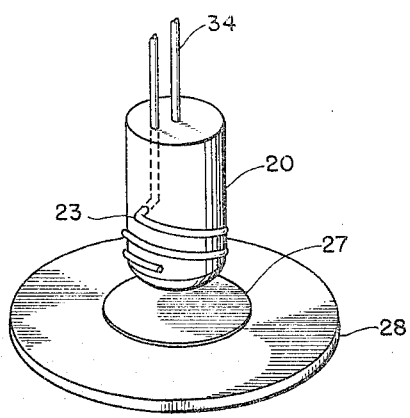
FIG. 2 is an exploded view showing the two membranes and electrodes of the invention in greater detail.

Referring now to the drawing, there is shown a body 10 mounted in a housing 11. The housing is adapted for insertion into a threaded opening 12 in the wall 13 of the container or line through which the sample passes. An O-ring 14 is located in an annular recess 15 in the wall 13 providing a seal between the wall and housing 11. The housing 11 is provided with a screw threaded opening 16 for receiving the body 10 preferably formed of an insulating material such as a casting resin; however, the body may be made from a metal such as stainless steel. An O-ring 17 is disposed in an annular recess 18 in the housing 11 for sealing the body 10 from the housing.

The body 10 is provided with a central bore 19 in which there is mounted in the lower portion an electrode base structure 20 which may be secured to the body 10 by an adhesive or any other suitable means. The electrode base 20 is provided with a sensing electrode 21 preferably made of a noble metal. The electrode is disposed in the lower portion of the electrode base and its outer surface or face 22 is flush with the outer surface of the electrode base. The electrode base structure is also formed of an insulating material and is provided at its outer cylindrical surface with a second electrode 23 preferably made of silver wire that is coated with a layer of silver chloride. A connector 33 is mounted on the top of body 10 for connecting a cable electrically to the electrode 23 and to electrode 21 via wire 34. The body 10, at the lower portion of its inside is provided with a recess 24 that provides an electrolyte space. One or more passages 25 may be provided through the lower portion of the body 10 to allow any excess electrolyte to be removed from the electrolyte space. Similarly, one or more passages 26 may be provided from the space between the housing 11 and the lower portion of the body 10 to the area through which a sample passes.

Overlying the electrode 21 and the lower portion of the electrode base 20 is a free-floating membrane 27. A preferred material for this membrane is polytetrafluoroalkane such as "Teflon," however, materials such as polyethylene and polypropylene have been found to be suitable. Overlying the "Teflon" membrane is a second membrane 28 made of an elastomeric material, preferably silicone rubber, which is fastened to the assembly by means of an O-ring 28' located in an annular recess 29 in the lower portion of body 10. An additional O-ring 30 is provided in recess 31 in the housing 11 to improve the dimensional stability of the membranes. An opening 32 in the bottom of the housing 11 provides flow communication between the sample being analyzed and the membrane assembly of the cell. A suitable thickness for the "Teflon" membrane 27 is about 0.001 inch (0.025 mm.) whereas the outer or second membrane 28 made of silicone rubber is preferably about five times the thickness of the "Teflon" membrane. Another characteristic of the two membranes 27 and 28 is that the silicon rubber membrane 28 is at least ten times more permeable to oxygen or other constituents in the sample being analyzed than is the "Teflon" membrane 27. The permeability of the membrane 28 is important since it readily permits the constituents being sampled to pass through the membrane to the "Teflon" membrane 27 without appreciably affecting the performance of the cell.

To assemble the cell, the free-floating "Teflon" membrane 27 is coated with an electrolyte on the surface facing the electrode 21 and then laid over the electrode 21 and the end of the electrode base 20. Next, the thicker and more permeable, elastomeric membrane 28 is laid over the first membrane 27 and the end of the body 10. It is secured under tension to the body 10 by the O-ring 28'. Thereafter, the housing 11 is screw-threaded over the body 10 and the O-ring 30 engages the lower portion of the membrane 28 and additionally tensions that membrane over the electrode base 20 and electrode 21. It is important that the screw-threaded housing 11 together with the O-rings 28' and 30 tension the outer membrane 28 sufficiently over the "Teflon" membrane 27 and electrode 21 so that under any normal temperature conditions the membrane 28 will remain under tension. Thus, under no circumstances will the elastomeric membrane become slack and permit the spacial relationship between "Teflon" membrane 27 and the outer face 22 of the electrode 21 to change. By this arrangement, the elastomeric membrane 28 may be assembled in the cell under the desired amount of tension which will not be affected by the ability of the person who is making the assembly.

The improvement in stability attained from the unique structure of the invention is considerable. Most marked is the improvement for those cells that are placed in sample media where large and sudden pressure changes occur. As mentioned above, by using a single "Teflon" or similar membrane, pressure changes result in permanent deformation of the membrane. This changes the special relationship of the electrode and membrane thereby causing a change in the conditions that determine the diffusion of the unknown constituent towards the electrode. Unfortunately, materials which are most suitable for obtaining a large response such as "Teflon" or polyethylene are at the same time subject to considerable cold flow and permanent deformation under the influence of tension, as explained before. It has been found that, having the "Teflon" membrane free-floating and by providing a much thicker silicone rubber outer membrane, the effect of cold flow is essentially avoided since silicone rubber is essentially free of the cold flow phenomena. Also, it appears that the speed of diffusion of the sample toward the electrode is essentially determined by the "Teflon" membrane placed against the electrode surface and not to an appreciable extent by the highly permeable silicone rubber membrane. Thus, the sensitivity of the cell is not appreciably affected by the addition of the second elastomeric membrane.

The additional feature of the invention, provided by the silicone rubber membrane being constantly under tension regardless of the temperature of the environment, helps maintain the spacial relationship between the face 22 of electrode 21 and membrane 27 substantially constant. Thus, the thickness of the electrolyte film on the surface of the electrode will not vary and high stability of the measurements of the cell will be obtained.

It will, of course, be understood that various changes can be made in the form, details, arrangement and proportions of the various parts without departing from the spirit or scope of the invention as defined by the appended claims.

What is claimed is:

1. A cell for polarographic analysis of a constituent in a sample comprising:
   a pair of spaced electrodes adapted to be joined by an electrolyte, one of said electrodes being a sensing electrode with a forward end;
   a first membrane permeable to said constituent overlying said forward end of said sensing electrode, said first membrane being subject to appreciable cold flow when tension is applied thereto;
   a second membrane overlying said first membrane and said pair of electrodes, said second membrane having a composition different from said first membrane and being substantially more permeable to said constituent than said first membrane, said second membrane being elastomeric and essentially free of cold flow when tension is applied thereto;
   clamping means surrounding said electrodes and positioned behind said forward end of said sensing electrode, said clamping means holding said second membrane under tension over said first membrane and said sensing electrode whereby said first membrane is held in close proximity to said forward end of said sensing electrode; and said membrane being positioned entirely forwardly of said clamping means and having its outer edge spaced from said clamping means whereby said clamping means applies no tension to said first membrane.

2. A cell as set forth in claim 1 wherein said first membrane is made of a material selected from the group consisting of polyethylene, polypropylene, and a polymer of a fluorinated alkane.

3. A cell as set forth in claim 1 wherein said second membrane is made of silicone rubber.

4. A cell for polarographic analysis of a constituent in a sample comprising:

a body member having a recess in one end thereof;

first and second spaced electrodes in said recess with said first electrode having a portion extending beyond said end of said body member, said electrodes being adapted to be joined by an electrolyte;

a first membrane permeable to said constituent overlying said portion of said first electrode, said first membrane being formed of a material which is subject to appreciable cold flow when tension is applied thereto;

a second membrane overlying said end of said body member and said first membrane thereby closing said recess;

said second membrane having a composition different from said first membrane and being substantially more permeable to said constituent than said first membrane, said second membrane being elastomeric and essentially free of cold flow when tension is applied thereto;

clamping means surrounding said body member and holding said second membrane under tension over said end of said body member whereby said first membrane is held in close proximity to said portion of said first electrode; and said first membrane being positioned so that its outer edge is disposed within said recess whereby said clamping means applies no tension to said first membrane.

5. A cell as set forth in claim 4 wherein said first membrane is made of a material selected from the group consisting of polyethylene, polypropylene and a polymer of a fluorinated alkane.

6. A cell as set forth in claim 4 wherein said second membrane is made of silicone rubber.

7. A cell as set forth in claim 4 wherein said first membrane is made of a polymer of a fluorinated alkane and second second membrane is made of silicone rubber.

References Cited by the Examiner

UNITED STATES PATENTS

| 2,913,386 | 11/1959 | Clark | 204—195 |
|---|---|---|---|
| 3,070,539 | 12/1962 | Arthur et al. | 204—1 |
| 3,098,813 | 7/1963 | Beebe et al. | 204—1 |

JOHN H. MACK, *Primary Examiner.*

MURRAY TILLMAN, WINSTON A. DOUGLAS, SAMUEL FEINBERG, T. TUNG,
*Assistant Examiners.*